(12) United States Patent
Kochen

(10) Patent No.: US 12,281,026 B1
(45) Date of Patent: Apr. 22, 2025

(54) COPPER FERRITE SYNTHESIS BY A BORATE METHOD

(71) Applicant: Robert L. Kochen, Boulder, CO (US)

(72) Inventor: Robert L. Kochen, Boulder, CO (US)

( * ) Notice: Subject to any disclaimer, the term of this patent is extended or adjusted under 35 U.S.C. 154(b) by 0 days.

(21) Appl. No.: 18/944,203

(22) Filed: Nov. 12, 2024

Related U.S. Application Data

(63) Continuation-in-part of application No. 18/772,446, filed on Jul. 15, 2024.

(51) Int. Cl.
*C01G 49/02* (2006.01)

(52) U.S. Cl.
CPC .......... *C01G 49/02* (2013.01); *C01P 2004/61* (2013.01)

(58) Field of Classification Search
None
See application file for complete search history.

(56) References Cited

U.S. PATENT DOCUMENTS

| | | | | | |
|---|---|---|---|---|---|
| 5,258,365 | A | * | 11/1993 | Sheng | C01G 41/006 505/783 |
| 2007/0003475 | A1 | * | 1/2007 | Lim | B01J 23/8472 502/305 |
| 2012/0298908 | A1 | * | 11/2012 | Ueyama | C04B 35/2683 252/62.51 R |

FOREIGN PATENT DOCUMENTS

| | | | | |
|---|---|---|---|---|
| CN | 106241883 | A | | 1/2018 |
| CN | 106861695 | B | * | 8/2019 ............ B01J 23/745 |
| CN | 112194187 | A | * | 1/2021 ............ B82Y 40/00 |

OTHER PUBLICATIONS

Zhang, E., et al. One-pot synthesis of magnetic copper ferrite nanocubes for hydrogen production by hydrolysis of sodium borohydride. Ceramics International 49 (2023) 23464-23470. (Year: 2023).*

Eiksson, G. and Rosén, E. Thermodynamic studies of high temperature equilibria. IX. Experimental determination of the stable solid (Cu, Fe, S, O)-phases in equilibrium with gas mixtures of SO2, O2, and N2 at temperatures 1000-1300 K. Scandinavian Journal of Metallurgy 3 (1974) 94-96. (Year: 1974).*

Comey, A. A dicitonary of chemical solubilities, inorganic. The Macmillan Company, New York, 1921, pp. 103-104. (Year: 1921).*

English translation of CN-106861695-B Description (Year: 2019).*

English translation of CN-112194187-A Description (Year: 2021).*

Synthesis and Characterization of Copper Ferrite Nanoparticles, IOP Conference Series: Materials, Faten Haithum Muiud et al 2020 IOP Conf. Ser.: Mater. Sci. Eng. 928 072125.

Dippong, T., Level, E.A.; Cadar, O. Recent Advances in Synthesis and Applications of MFe2O4 (M=Co, Cu, Mn, Ni, Zn) Nanoparticles. Nanomaterials 2021, 11(6), 1560.

Copper Ferrite Nanoparticles: Structural, Magnetic, Optical, Photocatalytic Activity and Blood Compatibility Properties Published. May 19, 2023, BioNanoScience, vol. 13, pp. 958-972, (2023).

(Continued)

*Primary Examiner* — Daniel Berns
*Assistant Examiner* — Zachary John Baum
(74) *Attorney, Agent, or Firm* — Patricia C. Brzostowicz; Superior Patent Group, LLC

(57) ABSTRACT

A copper ferrite synthesis describing the use of cuprous, ferric, and borate ions is disclosed. Cuprous and ferric compounds react with sodium borate to form cuprous ferric oxide precipitates. Oxidizing a cuprous ferric oxide with an oxygen enhanced flame, synthesizes copper ferrite. The cuprous ferric oxide may be reduced to nanoparticle size via pulverization to produce copper ferrite nanoparticles.

23 Claims, 4 Drawing Sheets

$$2CuCl + Na_2B_4O_7 \longrightarrow Cu_2B_4O_7(s) + 2NaCl$$

Cuprous Chloride + Sodium Borate ⟶ Cuprous Borate + Sodium Chloride

(56) References Cited

OTHER PUBLICATIONS

Review on Recent Advances of Synthesis, Magnetic Properties, and Water Treatment Applications of Cobalt Ferrite Nanoparticles and Nanocomposites, P. Vinosha, A. Manikandan, G. Nirmala Published in Journal of Superconductivity . . . Apr. 1, 2021 Materials Science, Environmental Science, Chemistry.

\* cited by examiner $2CuCl + Na_2B_4O_7 \longrightarrow Cu_2B_4O_7(s) + 2NaCl$

Cuprous Chloride + Sodium Borate $\longrightarrow$ Cuprous Borate + Sodium Chloride

FIG. 1

$$2Fe(NO_3)_3 + 3Na_2B_4O_7 \longrightarrow Fe_2(B_4O_7)_3(s) + 6NaNO_3$$

Ferric Nitrate + Sodium Borate ⟶ Ferric Borate + Sodium Nitrate

FIG. 2

$[Cu_2B_4O_7](s)$ + $[Fe_2(B_4O_7)_3](s)$ —> $(Cu_2O \cdot 2B_2O_3 / Fe_2O_3 \cdot 6B_2O_3)$

Cuprous Borate + Ferric Borate —> Cuprous/Ferric Boric Oxide Intermediate

—> $Cu_2O \cdot Fe_2O_3(s)$ + $8B_2O_3$

Cuprous Ferric Oxide Boric Oxide

FIG. 3

$$2Cu_2O \cdot Fe_2O_3 + O_2 \xrightarrow{Heat} 2CuO \cdot Fe_2O_3 + 2CuO$$

Cuprous Ferric Oxide + Oxygen —> Cupric Ferric Oxide + Cupric oxide
(Copper Ferrite)

COPPER FERRITE SYNTHESIS BY A BORATE METHOD

The following application is a continuation-in-part application for patent under 35 USC 111 (a). The present application claims priority to U.S. patent application Ser. No. 18/772,446 filed Jul. 15, 2024 of common inventorship and by the same applicant.

FIELD OF THE DISCLOSURE

This disclosure relates to the field of chemical synthesis of copper ferrite.

BACKGROUND

Copper Ferrite, $CuO \cdot Fe_2O_3$, or cupric ferric oxide has many applications due to unique properties including electrical conductivity and semiconductor behavior. It is thermally stable and shows considerable catalytic activity for oxygen generation. In addition, copper ferrite nanoparticles are of interest for potential application in water purification (Masunga, et al., J. of Env. Chem. Eng. Vol. 7, Iss. 3, Jun. 5, 2019, "Recent advances in copper ferrite nanoparticles and nanocomposites synthesis, magnetic properties and application in water treatment: Review"). Further, magnetic nanoparticles show potential in clinical and biological applications. In the last decade research on the synthesis of nanosized ferrites has increased but a simple, robust, and cost effective method for synthesis of copper ferrite nanoparticles is still needed.

SUMMARY OF THE DISCLOSURE

The present disclosure is drawn to a method for producing copper ferrite via a borate method. This borate method comprises the steps of: forming a cuprous ion solution, forming a ferric ion solution, mixing the cuprous ion solution and the ferric ion solution with a boric ion solution, and precipitating cuprous ferric oxide. The method may further comprise separating cuprous ferric oxide by filtration. The method may further comprise drying the cuprous ferric oxide. The method may further comprise pulverizing or physically manipulating the cuprous ferric oxide. The method may further comprise sieving or separating the cuprous ferric oxide based on particle size. The method may further comprise oxidizing cuprous ferric oxide to produce cupric ferric oxide, or copper ferrite. This oxidation may comprise using an oxygen enhanced flame.

A synthesis for copper ferrite is described, wherein when cuprous and ferric ions are combined with borate ions, a cuprous ferric oxide ($Cu_2O \cdot Fe_2O_3$) precipitate is formed. This precipitate is filtered, air dried, pulverized and oxidized to copper ferrite ($CuO \cdot Fe_2O_3$).

As such the disclosure comprises a method for producing copper ferrite, the method comprising: combining cuprous borate and ferric borate to form cuprous boric oxide and ferric boric oxide intermediates; wherein cuprous ferric oxide is formed from the cuprous boric oxide and ferric boric oxide intermediates; and oxygenating cuprous ferric oxide to form copper ferrite. The method may further comprise wherein the formation of cuprous ferric oxide involves heating. The method may further comprise wherein the formation of cuprous ferric oxide involves heating to boiling. The method may further comprise wherein the cuprous ferric oxide is a precipitate that is dried. The method may further comprise wherein the cuprous ferric oxide is reduced in size. The method may further comprise wherein the cuprous ferric oxide is reduced in size to less than 74 microns. The method may further comprise wherein the cuprous ferric oxide is reduced in size via physical means. The method may further comprise wherein the cuprous ferric oxide is pulverized. The method may further comprise wherein the cuprous ferric oxide is separated based on size. The method may further comprise wherein the oxygenating of cuprous ferric oxide comprises heating with an oxygen enriched flame. The method may further comprise separating copper ferrite and cupric oxide via a magnet.

In other embodiments the disclosure comprises a method for producing copper ferrite, the method comprising the steps of: forming a cuprous ion solution; forming a ferric ion solution; mixing the cuprous ion solution and the ferric ion solution with a boric ion solution to precipitate cuprous ferric oxide; and transforming the cuprous ferric oxide to cupric ferric oxide. The method may further comprise wherein the cuprous ferric oxide is transformed to cupric ferric oxide via oxygenation. The method may further comprise wherein the oxygenation is accomplished via oxygen enriched heating. The method may further comprise separating the cuprous ferric oxide. The method may further comprise separating the cuprous ferric oxide based on size. The method may further comprise drying the cuprous ferric oxide. The method may further comprise physically reducing the size of the cuprous ferric oxide. The method may further comprise wherein the cuprous ferric oxide is reduced via pulverization. The method may further comprise wherein the cuprous ferric oxide is reduced to less than 74 microns. The method may further comprise wherein the cuprous ferric oxide is separated based on a size of less than 74 microns. The method may further comprise separating copper ferrite and cupric oxide via a magnet.

In another embodiment, the synthesis of cupric oxide is disclosed. The method for synthesis of cupric oxide comprises the steps of: combining cuprous borate and ferric borate to form cuprous boric oxide and ferric boric oxide intermediates; wherein cuprous ferric oxide is formed from the cuprous boric oxide and ferric boric oxide intermediates; and oxygenating cuprous ferric oxide to form cupric oxide.

BRIEF DESCRIPTION OF THE DRAWINGS

FIG. 1 is a chemical equation depicting obtaining cuprous borate from cuprous chloride and sodium borate.

FIG. 2 is a chemical equation depicting obtaining ferric borate from ferric nitrate and sodium borate.

FIG. 3 is a chemical equation depicting obtaining a cuprous and ferric boric oxide intermediate from cuprous borate and ferric borate to produce cuprous ferric oxide and cupric oxide.

Figure 4:
FIG. 4 is a chemical equation depicting obtaining cupric ferric oxide or copper ferrite from cuprous ferric oxide and oxygen.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DISCLOSURE

Terms

As used herein, a "cuprous ion", Cu(I) refers to elemental copper in its +1 oxidation state, denoted as $Cu^{1+}$. A cuprous ion may combine with other elements or compounds to form a "cuprous ion compound". Examples of cuprous ion compounds include but are not limited to copper, or cuprous oxide ($Cu_2O$), cuprous borate ($Cu_2B_4O_7$), cuprous chloride (CuCl), cuprous fluoride (CuF), cuprous iodide (CuI), cuprous sulfide ($Cu_2S$), cuprous thiocyanate (CuSCN) and cuprous selenide ($Cu_2Se$).

As used herein, a "cupric ion", CU(II) refers to elemental copper in its +2 oxidation state, denoted as $Cu^{2+}$. A cupric ion may combine with other elements or compounds to form a "cupric ion compound". Examples of cupric ion compounds include but are not limited to copper, or cupric sulfate ($CuSO_4$), cupric ferric oxide, or copper ferrite ($CuO \cdot Fe_2O_3$) or ($CuOFe_2O_3$), cupric oxide (CuO), cupric borate ($CuB_4O_7$), cupric boride ($Cu_3B_2$), cupric nitrate ($Cu(NO_3)_2$), cupric fluoride ($CuF_2$), cupric bromide ($CuBr_2$), cupric chloride ($CuCl_2$), cupric metaborate ($Cu(BO_2)_2$) and cupric cyanide $Cu(CN)_2$.

As used herein, a "ferrous ion" refers to elemental iron in its +2 oxidation state, denoted as $Fe^{2+}$. A ferrous ion may combine with other elements or compounds to form a "ferrous ion compound". Examples of ferrous ion compounds include but are not limited to ferrous chloride ($FeCl_2$), ferrous sulphate $FeSO_4$, ferrous nitrate $Fe(NO_3)_2$, ferrous ammonium sulfate $Fe(NH_4)_2(SO_4)_2$, ferrous borate $FeB_4O_7$, ferrous carbonate $FeCO_3$, and ferrous oxide FeO.

As used herein, a "ferric ion" refers to elemental iron in its +3 oxidation state, denoted as $Fe^{3+}$. A ferric ion may combine with other elements or compounds to form a "ferric ion compound". Examples of ferric ion compounds include but are not limited to ferric chloride ($FeCl_3$), ferric sulphate ($Fe_2(SO_4)_3$), ferric nitrate $Fe(NO_3)_3$, ferric ammonium sulfate $FeNH_4(SO_4)_2$, ferric oxide $Fe_2O_3$, and ferric borate $Fe_2(B_4O_7)_3$.

As used herein, a "borate ion" refers to borate in its −3 oxidation state, denoted as $BO_3^{3-}$. A borate ion may combine with other elements or compounds to form a "borate ion compound". Examples of borate ion compounds include but are not limited to sodium borate, $Na_2B_4O_7$, potassium borate, $K_2B_4O_7$, boric acid, $H_2B_4O_7$, cuprous borate ($Cu_2B_4O_7$), and ferric borate ($Fe_2(B_4O_7)_3$).

As used herein, a "cuprous oxide intermediate" may be represented by the chemical formula $CuO \cdot 2B_2O_3$.

As used herein, a "ferrous boric oxide intermediate" may be represented by the chemical formula $FeO \cdot 2B_2O_3$.

As used herein, a "ferric boric oxide intermediate" may be represented by the chemical formula $Fe_2O_3 \cdot 6B_2O_3$.

As used herein, "magnetite" is a solid mineral represented by the formula $FeO \cdot Fe_2O_3$ (s), wherein the "s" represents a solid.

As used herein, "sodium sulfate" is represented by the chemical formula $Na_2SO_4$.

As used herein, "sodium nitrate" is represented by the chemical formula $NaNO_3$.

As used herein, "boric oxide" is represented by the chemical formula $B_2O_3$.

As used herein, "ammonium sulfate" is represented by the chemical formula $(NH_4)_2SO_4$.

As used herein "Cu" indicates copper, "Fe" indicates iron, "$SO_4$" indicates sulfate, "Na" indicates sodium, "B" indicates boron, "O" indicates oxygen, "N" indicates nitrogen, "H" indicates hydrogen, "S" indicates sulfur, "Cl" indicates chloride, "$NO_3$" indicates nitrate, "$B_4O_7$" indicates borate, "$B_2O_3$" indicates boric oxide, and "$NH_4$" indicates ammonium.

As used herein, "s" or "(s)" denotes a solid, "l" or "(l)" denotes a liquid, "g" or "(g)" denotes a gas, and "aq" or "(aq)" denotes an aqueous, or water-based, solution.

As used herein, "a precipitate" is a solid formed by a precipitation reaction, the solid being insoluble in an aqueous solution, or supernatant, of the reaction.

A used herein, a "precipitation reaction" is a reaction that transforms a dissolved substance, being an element or compound, for example, into an insoluble solid from a supernatant solution.

As used herein, a "supernatant" is an aqueous solution, or soluble liquid fraction, in which one or more elements or compounds may be dissolved, after precipitation of insoluble solids.

As used herein, a "stoichiometric amount" or "stoichiometric ratio" of a reagent is the optimum amount or ration where, assuming that the reaction proceeds to completion, all of the reagent is consumed and therefore there is no deficiency or excess of the reagent.

As used herein, a "reagent" or "reactant" is an element, substance, or compound added to a system or reaction to cause a chemical reaction.

As used herein, "pulverization" or "pulverizing" indicates physically grinding, pressing, or otherwise manipulating.

As used herein, "sieving" indicates physical separation based on size via either exclusion or inclusion of the target.

As used herein, "oxidation" or "oxidation reaction" denotes a reaction which comprises a loss of electrons or increase in oxidation state of a molecule, atom, or ion in a chemical reaction. Oxidation may result in adding an oxygen to a molecule, atom, or compound therefore resulting in an electron loss and increase in oxidation state. For example, cuprous ferric oxide may undergo an oxygenation reaction with oxygen to form copper ferrite. This oxygenation reaction may be accomplished via heating. This oxygenation reaction may be accomplished via heating with an oxygenated heat source. This oxygenation reaction may be accomplished via heating with an oxygen-enriched flame.

As used herein, "reduction" or "reduction reaction" denotes a reaction which comprises a gain of electrons or decrease in oxidation state of a molecule, atom, or ion in a chemical reaction. Reduction may also be defined as the gain of hydrogen.

Common metric units are used throughout including but not limited to μg or ug, being microgram, mg, being milligram, g, being gram or grams, kg, being kilogram, μl or ul, being microliter, ml, being milliliter, l, being liter.

DESCRIPTION OF THE DISCLOSURE

The present disclosure is a copper ferrite formed via the method described herein and a method for synthesis of copper ferrite. As represented in FIG. 1, stoichiometric amounts of aqueous cuprous chloride, CuCl, is combined with stoichiometric amounts of aqueous sodium borate, also known as borax, or $Na_2B_4O_7$, $Na_2B_4O_7 \cdot 10H_2O$ in solution, to form a cuprous ion, in the form of cuprous borate, $Cu_2B_4O_7$ (s), as a solid precipitate and sodium chloride, NaCl, in the aqueous supernatant. Other cuprous ions may be formed and employed including but not limited to cuprous fluoride (CuF), cuprous iodide (CuI), cuprous sulfite ($Cu_2SO_3$), and cuprous selenide ($Cu_2Se$).

As represented in FIG. 2, stoichiometric amounts of aqueous ferric nitrate, $2Fe(NO_3)_3$, $Fe(NO_3)_3 \cdot 9H_2O$, or other ferric ion compound, is combined with stoichiometric amounts of aqueous sodium borate, also known as borax, or $Na_2B_4O_7$, $Na_2B_4O_7 \cdot 10H_2O$ in solution, to form a ferric ion, being ferric borate, $Fe_2(B_4O_7)_3$ (s), as a solid precipitate and sodium nitrate, $6NaNO_3$, in the aqueous supernatant. Other ferric ions may be employed including but not limited to ferric bromide ($FeBr_3$), ferric chloride ($FeCl_3$), ferric fluoride ($FeF_3$), and ferric thiocyanate ($Fe(SCN)_3$).

As represented in FIG. 3, the cuprous borate(s) and ferric borate(s) in supernatants of sodium chloride and sodium nitrate, respectively, are heated, forming cuprous boric oxide and ferric boric oxide intermediates, $Cu_2O \cdot 2B_2O_3$ and $Fe_2O_3 \cdot 6B_2O_3$, respectively. Upon cooling, cuprous ferric oxide solid, $Cu_2O \cdot Fe_2O_3$ (s), is formed and precipitates from a boric oxide, $B_2O_3$, aqueous supernatant.

As represented in FIG. 4, stoichiometric amounts of cuprous ferric oxide solid, $Cu_2O \cdot Fe_2O_3$ and oxygen are combined to form cupric ferric oxide, or copper ferrite, $CuO \cdot Fe_2O_3$ and cupric oxide, $CuO$. The copper ferrite may be reduced to nanoparticle size via pulverization to produce copper ferrite nanoparticles either via reducing the size of an intermediate, cuprous ferric oxide, in the synthesis process or by reducing copper ferrite size directly.

EXAMPLES

TABLE 1

Solutions Used in the Following Examples

| Solution | Ingredients |
| --- | --- |
| A | 0.65 g cuprous chloride was dissolved in 100 ml water |
| B | 2.67 g ferric nitrate was dissolved in 25 ml water |
| C | 5.04 g sodium borate was dissolved in 75 ml water |
| D | 1.26 g sodium borate was dissolved in 50 ml water |
| E | 3.78 g sodium borate was dissolved in 50 ml water |

Example 1

As an example, synthesis of at least one gram of copper ferrite was attempted. All compounds used were reagent grade and distilled water was employed. For the reaction, 0.65 grams (g) cuprous chloride (CuCl) was dissolved in 100 ml hot distilled water, wherein the water was heated to 60° C. to form a cuprous chloride solution, solution A as indicated in Table 1. An amount of 2.67 g ferric nitrate ($Fe(NO_3)_3 \cdot 9H_2O$) was dissolved in 25 ml hot distilled water, wherein the water was heated to 60° C. to form a ferric nitrate solution, solution B as indicated in Table 1. An amount of 5.04 g of sodium borate ($Na_2B_4O_7 \cdot 10H_2O$) being a stoichiometric amount, was dissolved in 75 ml hot distilled water, wherein the water was heated to 60° C. to form a sodium borate solution, solution C as indicated in Table 1.

The temperature of the water for all solutions created in all examples of the disclosure was chosen based on solubility. A range of water temperatures may be used, however decrease in water temperature may result in reduced solubility. For example, three grams of sodium borate will dissolve in 100 ml of water at a temperature of 25° C., whereas 30 grams dissolves in 100 ml of water at a temperature of 60° C. Also, cuprous chloride is sparingly soluble in water. Sparingly soluble is defined as one gram of material dissolves in 30 to 100 ml of solvent.

The dissolved cuprous chloride solution, solution A, and the ferric nitrate solution, solution B, were combined and added to solution C. Upon combining the three solutions, a brown precipitate of cuprous ferric oxide ($Cu_2O \cdot Fe_2O_3$) forms with supernatants sodium chloride (NaCl), sodium nitrate ($NaNO_3$), and boric oxide ($B_2O_3$) and the combined solution is further heated to boiling (100° C.). FIG. 1 illustrates the forming of cuprous borate and sodium chloride. FIG. 2 illustrates the forming of ferric borate and sodium nitrate. FIG. 3 illustrates a phase transformation producing cuprous ferric oxide and boric oxide. The precipitate was next filtered from the supernatants with Whatman No. 1 paper with a pore size of 11 micron, dried in a convection oven at 75° C., pulverized with mortar and pestle, and sieved to a particle size of 74 microns. Subsequently, 0.5 g cuprous ferric oxide was placed into a porcelain cup and heated directly with an oxygen enhanced flame, examples being propane and oxygen gas. Within seconds, the brown, non-magnetic cuprous ferric oxide transformed into magnetic cupric ferric oxide or copper ferrite. Two moles of cuprous ferric oxide combine with one mole of oxygen and transform into two moles of copper ferrite and two moles of cupric oxide as illustrated in FIG. 4. The resulting copper ferrite and non-magnetic cupric oxide were sieved together and measure between 11 and 74 microns in size. The copper ferrite and cupric oxide can be separated via a magnet.

Example 2

In another example, synthesis of at least one gram of copper ferrite was attempted. All compounds used were reagent grade and distilled water was employed. For the reaction, 0.65 grams (g) cuprous chloride was dissolved in 100 ml hot distilled water, wherein the water was heated to 60° C. to form a cuprous chloride solution A as indicated in Table 1. An amount of 2.67 g of ferric nitrate was dissolved in 25 ml hot distilled water, wherein the water was heated to 60° C., to form a ferric nitrate solution B as indicated in Table 1. The cuprous chloride solution and ferric nitrate solution represent 1:1 mole ratio. An amount of 1.26 g of sodium borate, being a stoichiometric amount, was dissolved in 50 ml hot distilled water, wherein the water was heated to 60° C., to form a sodium borate solution, solution D as indicated in Table 1. The sodium borate solution, solution D, was added to the cuprous chloride solution A, to form a cuprous borate precipitate and sodium chloride supernatant, as represented by FIG. 1. Additionally, 3.78 g of sodium borate, a stoichiometric amount, was dissolved in 50 ml hot distilled water as solution E as indicated in Table 1, the water was heated to 60° C. and added to the ferric nitrate solution B to form a ferric borate precipitate and sodium nitrate supernatant as represented by FIG. 2. Both cuprous borate and ferric borate precipitates, with their respective sodium chloride and sodium nitrate supernatants, were combined to form cuprous ferric oxide as represented by FIG. 3, and then heated to boiling. The precipitate was next filtered from the supernatants with Whatman No. 1 paper with a pore size of 11 micron, dried in a convection oven at 75° C., pulverized with mortar and pestle, and sieved to a particle size of 74 microns. Subsequently, 0.5 g cuprous ferric oxide was placed into a porcelain cup and heated directly with an oxygen enhanced flame, being a propane and oxygen gas. Within seconds, the brown, non-magnetic cuprous ferric oxide transformed into magnetic cupric ferric oxide (copper ferrite). Two moles of cuprous ferric oxide combine with one mole of oxygen and transform into two moles of copper ferrite and two moles of cupric oxide as illustrated in FIG. 4. The resulting copper ferrite and non-magnetic cupric oxide were sieved together and measure between 11 and 74 microns in size. The copper ferrite and cupric oxide can be separated via a magnet.

Example 3

In another example, 0.65 g of cuprous chloride and 2.67 g of ferric nitrate, a 1:1 mole ratio, were combined with 5.04 g of sodium borate, being a stoichiometric amount. All were dissolved in 200 ml hot distilled water, wherein the water was heated to 60° C. to form a precipitate of cuprous boric oxide with supernatants sodium chloride (NaCl), sodium nitrate ($NaNO_3$), and boric oxide ($B_2O_3$) as illustrated in FIGS. 1, 2 and 3 and then heated to boiling. The precipitate was next filtered from the supernatants with Whatman No. 1 paper with a pore size of 11 micron, dried in a convection oven at 75° C., pulverized with mortar and pestle, and sieved to a particle size of 74 microns. Subsequently, 0.5 g cuprous ferric oxide was placed into a porcelain cup and heated directly with an oxygen enhanced flame, being a propane and oxygen gas. Within seconds, the brown, non-magnetic cuprous ferric oxide transformed into magnetic cupric ferric oxide, copper ferrite. Two moles of cuprous ferric oxide combine with one mole of oxygen and transform into two moles of copper ferrite and two moles of cupric oxide as illustrated in FIG. 4. The resulting copper ferrite and non-magnetic cupric oxide were sieved together and measure between 11 and 74 microns in size. The copper ferrite and cupric oxide can be separated via a magnet.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A method for producing copper ferrite, the method comprising the steps of:
    a) combining cuprous borate and ferric borate to form cuprous boric oxide and ferric boric oxide intermediates;
    b) wherein cuprous ferric oxide is formed from the cuprous boric oxide and ferric boric oxide intermediates; and
    c) oxygenating cuprous ferric oxide to form copper ferrite.

2. The method of claim 1, wherein the formation of cuprous ferric oxide involves heating.

3. The method of claim 2, wherein the formation of cuprous ferric oxide involves heating to boiling.

4. The method of claim 1, wherein the cuprous ferric oxide is a precipitate that is dried.

5. The method of claim 4, wherein the cuprous ferric oxide is reduced in size.

6. The method of claim 5, wherein the cuprous ferric oxide is reduced in size to less than 74 microns.

7. The method of claim 5, wherein the cuprous ferric oxide is reduced in size via physical means.

8. The method of claim 5, wherein the cuprous ferric oxide is pulverized.

9. The method of claim 5, wherein the cuprous ferric oxide is separated based on size.

10. The method of claim 4, wherein the oxygenating of cuprous ferric oxide comprises heating with an oxygen enriched flame.

11. The method of claim 1, further comprising separating the copper ferrite with a magnet.

12. A method for producing copper ferrite, the method comprising the steps of:
    a) forming a cuprous ion solution;
    b) forming a ferric ion solution;
    c) mixing the cuprous ion solution and the ferric ion solution with a boric ion solution to precipitate cuprous ferric oxide; and
    d) transforming the cuprous ferric oxide to copper ferrite.

13. The method of claim 12, wherein the cuprous ferric oxide is transformed to cupric ferric oxide via oxygenation.

14. The method of claim 13, wherein the oxygenation is accomplished via oxygen enriched heating.

15. The method of claim 12 further comprising separating the cuprous ferric oxide.

16. The method of claim 12 further comprising separating the cuprous ferric oxide based on size.

17. The method of claim 12 further comprising drying the cuprous ferric oxide.

18. The method of claim 12 further comprising physically reducing the size of the cuprous ferric oxide.

19. The method of claim 18, wherein the cuprous ferric oxide is reduced via pulverization.

20. The method of claim 18, wherein the cuprous ferric oxide is reduced to less than 74 microns.

21. The method of claim 20 wherein the cuprous ferric oxide is separated based on a size of less than 74 microns.

22. The method of claim 12 further comprising separating the copper ferrite with a magnet.

23. A method for synthesis of cupric oxide, the method comprising the steps of:
    a) combining cuprous borate and ferric borate to form cuprous boric oxide and ferric boric oxide intermediates;
    b) wherein cuprous ferric oxide is formed from the cuprous boric oxide and ferric boric oxide intermediates; and
    c) oxygenating cuprous ferric oxide to form cupric oxide.

* * * * *